(12) United States Patent
Vignocchi et al.

(10) Patent No.: US 6,412,167 B1
(45) Date of Patent: Jul. 2, 2002

(54) APPARATUS FOR CONNECTING A STAR CROSS PIECE TO A LEG OF A BICYCLE OR MOTORCYCLE FORK

(75) Inventors: Loris Vignocchi, Zola Predosa; Sandro Musiani, Marzabotto, both of (IT)

(73) Assignee: Marzocchi S.p.A., Bologna (IT)

( * ) Notice: Subject to any disclaimer, the term of this patent is extended or adjusted under 35 U.S.C. 154(b) by 0 days.

(21) Appl. No.: 09/374,475

(22) Filed: Aug. 13, 1999

(30) Foreign Application Priority Data

Jul. 20, 1999 (IT) ........................................ BO99A0405

(51) Int. Cl.[7] .............................................. B23P 21/00
(52) U.S. Cl. .............................. 29/787; 29/447; 29/786; 29/790; 29/800
(58) Field of Search ........................ 29/407.01, 407.05, 29/407.09, 407.1, 430, 709, 785, 792, 800, 897.2, 447, 468, 705, 722, 787, 790

(56) References Cited

U.S. PATENT DOCUMENTS

| | | | |
|---|---|---|---|
| 4,655,676 A | * | 4/1987 | Jannborg et al. ............... 29/792 |
| 4,680,849 A | * | 7/1987 | Diekman ...................... 29/252 |
| 5,640,756 A | * | 6/1997 | Brown et al. .................. 29/701 |
| 5,768,768 A | * | 6/1998 | Best ............................ 29/792 |

FOREIGN PATENT DOCUMENTS

JP          404293690 A  * 10/1992  ................ 29/897.2

* cited by examiner

Primary Examiner—S. Thomas Hughes
Assistant Examiner—Jermie E. Cozart
(74) Attorney, Agent, or Firm—Ward & Olivo

(57) ABSTRACT

The pieces to be reciprocally connected are mechanically manufactured with tolerances such that the external diameter of the ends of the pipes (6,6') is suitably greater at the internal diameter of the seat ends of the star cross pieces (1). The star cross pieces are heated to a temperature which does not provoke a permanent deformity in the pieces and which is such as to slightly increase the diameter of the their seats. The pipes are inserted instead into the ends to be connected, in a liquid nitrogen bath that properly contracts the external diameter of said ends and brings them substantially to a condition of equality or inferiority with respect to the diameter of the dilated seats and the ends of the star cross pieces. The cooled ends of the pipes are then inserted into the heated end of the seats of the cross pieces and when the pieces return to room temperature, they are connected with the foreseen tightness. The finding also foresees an apparatus for the automatic execution of said manufacturing procedure.

10 Claims, 7 Drawing Sheets

APPARATUS FOR CONNECTING A STAR CROSS PIECE TO A LEG OF A BICYCLE OR MOTORCYCLE FORK

BACKGROUND OF THE INVENTION

The finding refers to the anterior forks for bicycles or motorcycles, in particular to the telescopic forks for the so-called mountain bikes or off road bicycles, or for off-road motorcycles, which are typically used on bumpy terrain and/or steep uphill or downhill slopes. The finding specifically refers to these telescopic forks equipped with upper cross braces or star cross with a seat in the center into which the end of the steering column is connected. And is equipped at the ends with seats into which the ends of the parallel pipes are connected and opposite to the steering pipe and are meant to slide telescopically in solid sheaths with the bottom end at the wheel hub, which are in every telescopic equipment as supplied with elastic methods which normally maintain the same unit in an extended position, with shock absorbing systems being foreseen.

SUMMARY OF THE INVENTION

For the connection of said pipes to the star cross, different methods are currently being used which are however, difficult to automate, are not quickly carried out, and are not at a good level of technological reliability. To resolve the noted technical problems in the specific aforesaid area, the finding proposes a method which includes:

a phase in which the pieces to be reciprocally connected are manufactured, with tolerances such that the external diameter of the ends of the pipes is properly greater to the internal diameter of the star cross end seats;

a heating phase for the star cross, at a temperature which does not promote permanent deformities in the piece and is sufficient to slightly increase the internal diameter of the pipe mounting seat;

a cooling phase at the proper temperature of the ends of the pipes, preferably through the immersion of said extremities into liquid nitrogen, in a manner such that the external diameter of the pipes themselves shrinks in a suitable manner;

rapid and easier insertion of the cooled and contracted pipe ends, in the seats of the dilated end of the heated star cross, without having the disadvantage of a pressure connection occur, since the ends of the pipes enter into the seats of the star cross without or with a slight interference. When the star cross and the pipes return to room temperature, they turn out to be fixed and connected with the expected tightness.

The apparatus for carrying out of said method includes:

a loading station for the pipes and the star cross pieces, all of which are upside down with respect to the position they are used in, having been set in a vertical preset position, while the others are placed horizontally;

at least one robot arm, equipped at the end with a pair of pliers for the outside, to grasp the a couple of pipes and equipped with at least one plier for the inside, to grasp the star cross for the central seat which is intended to carry the steering pipe;

a possible station to check the internal diameter of the star cross seats and the external diameter of the ends of the pipes, immediately after the pieces have been taken from the loading station;

an oven in which said robot arm cyclically inserts a star cross taken from said loading supply and extracts a heated one, a station with a tank to stock liquid nitrogen and is open on top in order to permit the introduction of the ends of the pipes, an assembly station, equipped with the means to hold an overturned star cross horizontally, taken from the oven and the means to support above the seat ends of this, of the corresponding overturned and cooled pipes on their lower ends and equipped with the means to properly center the pipes and to push the same with their lower ends into said seat ends of the star cross;

a station for collecting and removing the star crosses with the pipes mounted.

BRIEF DESCRIPTION OF THE DRAWINGS

The major characteristics of the finding, and the advantages which derive from it, will be appear evident in the following description, illustrated only as a non limiting example, of a preferred form of accomplishing the same, in the figures of the seven tables attached to the drawings, in which:

FIG. 1 illustrates in perspective a fork of the type referred to;

DETAILED DESCRIPTION OF A PREFERRED EMBODIMENT

Figure 1:
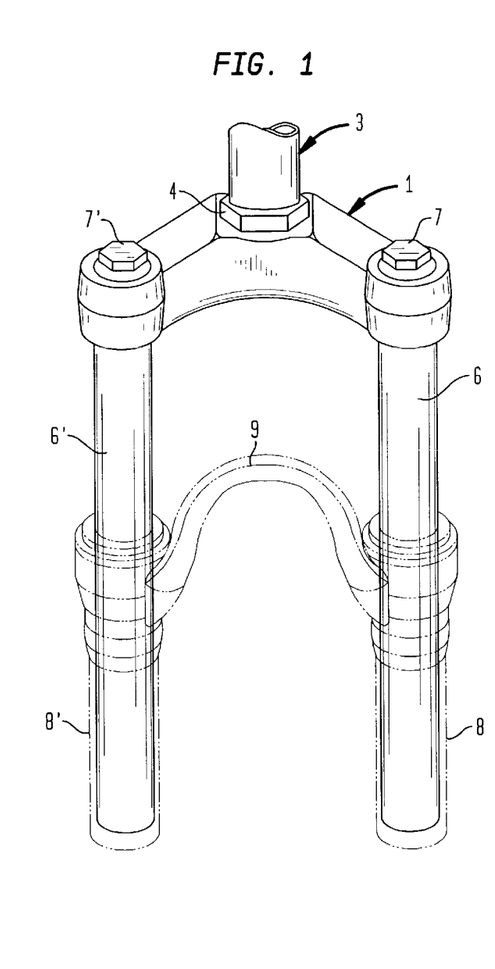
Figure 13:
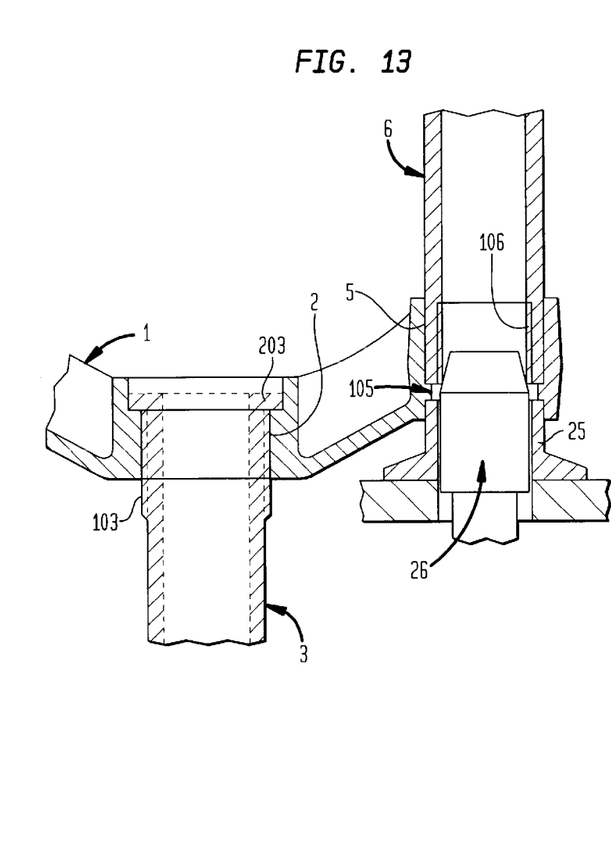
FIG. 13 illustrates the cross section of the seat at an end of a star cross, at the end of the assembly phase of this into the corresponding end of a pipe.

From FIGS. 1 and 13 it is noted that the forks which are referred to include a star cross 1, whose conformation is usually ribbed, for example with an upside down U section, equipped in the center part with a round seat section 2, with a step profile, of a diameter which increased toward the bottom, in which the enlarged and threaded end 103 is inserted, with the arresting head 203, in the steering pipe 3 which is then axially blocked by means of a metal ring 4. The star cross 1 is equipped at the seat ends 5-5' parallel to the central one 2, in which must be mounted and connected with the necessary tightening, the ends of the cylindrical and round section pipes 6,6' which meet the arresting head against the projection ring 105 foreseen concentrically in said seats, a short distance from their upper end. The ends of the pipes inserted in seats 5 are an internally threaded example as indicated with 106, in order to allow the screwing in of their respective sealing plugs 7,7'. The pipes 6,6' are meant to cooperate telescopically with the sheaths 8,8' usually interconnected to the upper end by means of an antitorsion cross piece 9, since said sheaths are closed at their lower end and fixed to the ends of the hub of the front wheel of the bicycle and being in the telescopic units 6, 8, 6' and 8' provided with the elastic means which usually keep these units extended, and are provided with means for absorbing shocks.

Figure 2:
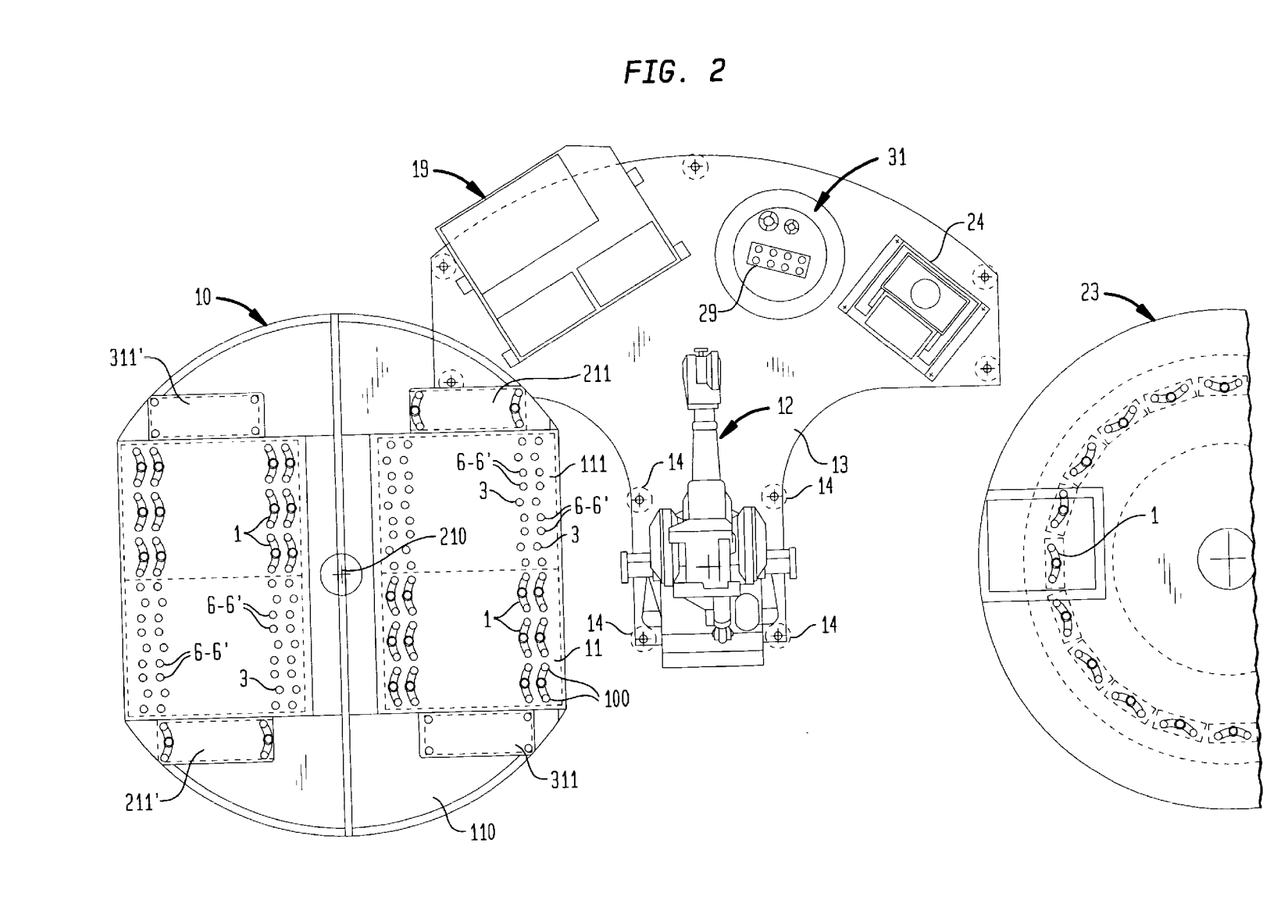
FIG. 2 is a schematic and in plan view from above said apparatus.
Figure 3:
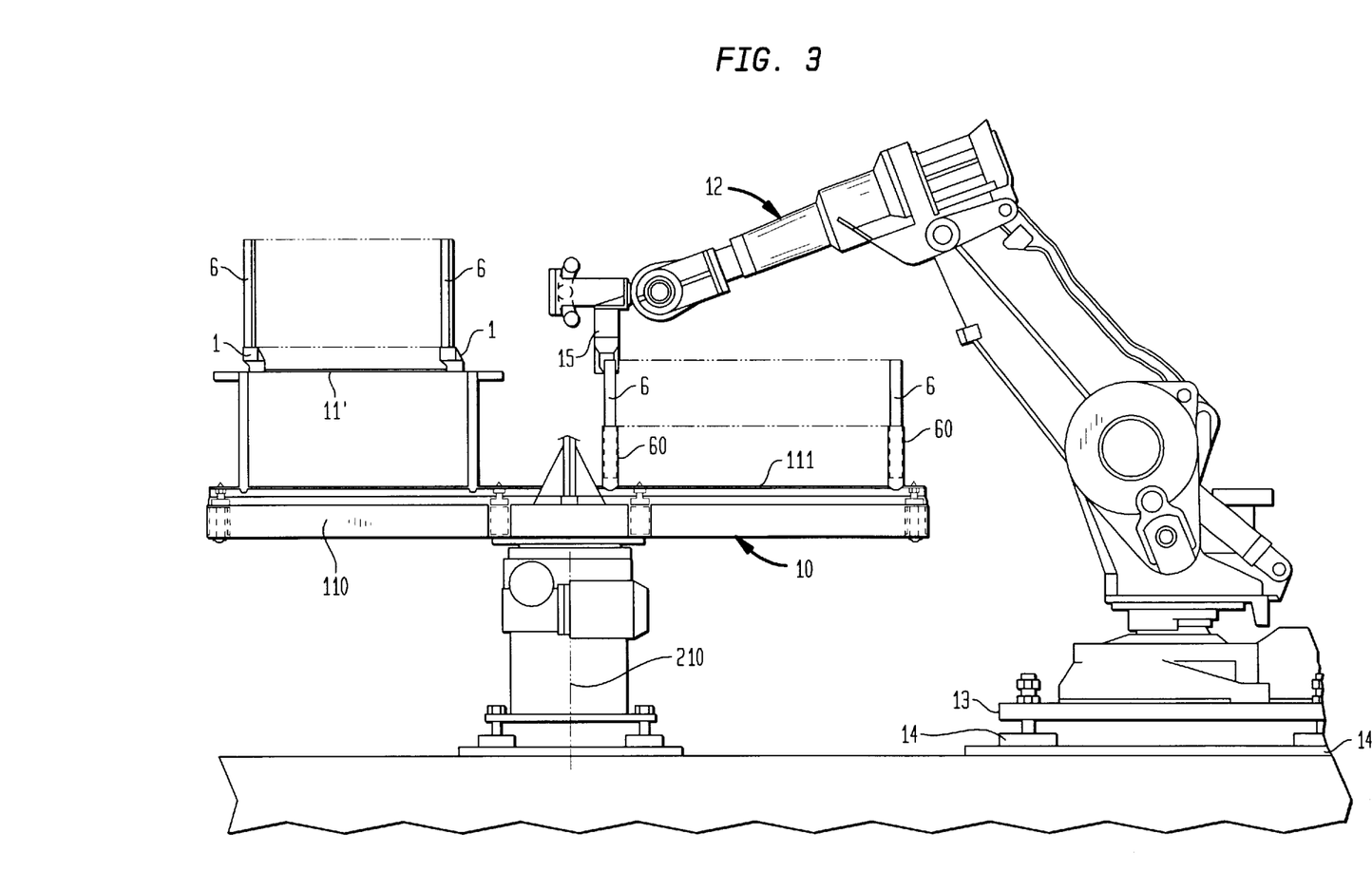
FIG. 3 is a view in lateral elevation of the robot arm during the cooperation with the loading and unloading station of the pieces to be assembled and of the assembled pieces.

With reference to FIG. 2 we note that the apparatus according to the invention includes a station 10 supplied with a horizontal table 110 which on command turns one hundred eighty degrees around its' own vertical axis 210 and is supplied with diametrically opposed pairs of horizontal trays 11, 111 and 11', 111 placed side by side, of which 11, 11' are supplied with lined up rows of pairs of vertical pegs 100 which involve the seat ends 5, 5' of the star cross 1 which are turned overturned with respect to their useful position, laid out horizontally and lined up in various rows. The trays 111, 111' are instead equipped with rows of vertical pipes 60 (FIG. 3) in which the partially protruding pipes 6, 6' are inserted and if necessary the pipes 3 before those for steering (see further) The pipes are oriented towards the bottom with their ends destined for connection in the seats 5, 5' of the star cross 1. In the example in FIG. 1, the trays 11, 111 are in the apparatus' loading phase, while trays 11', 111' are in an unloading phase of pieces assembled in a preceding work cycle and being refilled with pieces to be assembled later, for example, by an operator. Laterally to the trays, on their external side, small supplementary trays are provided and they too are also horizontal 211, 311, and 211', 311' ready to receive the cross star discards and the pipes which do not pass the size inspection respectively (see further), these supplementary trays being placed in a way which sees those for the pipes, next to the principal trays for the star crosses and those for the star crosses next to the principal trays for the pipes.

Figure 4:
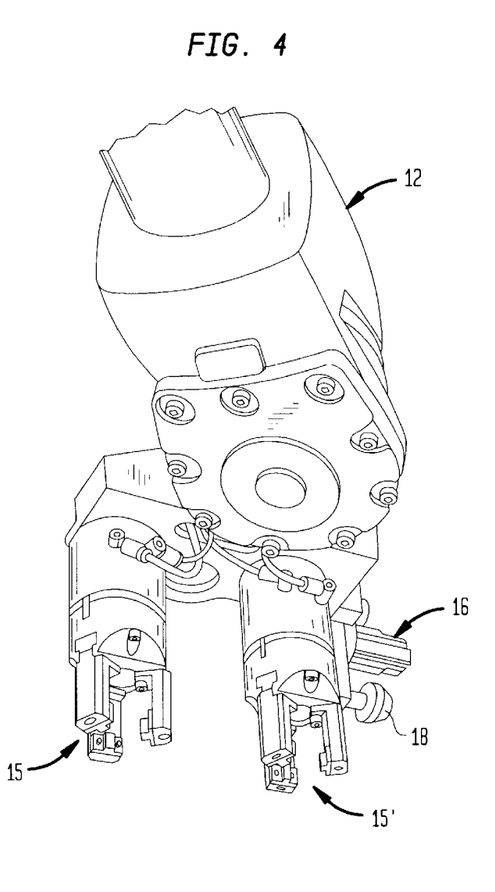
FIGS. 4 and 5 illustrate in perspective the pincers planned for the end of the robot arm.
Figure 5:
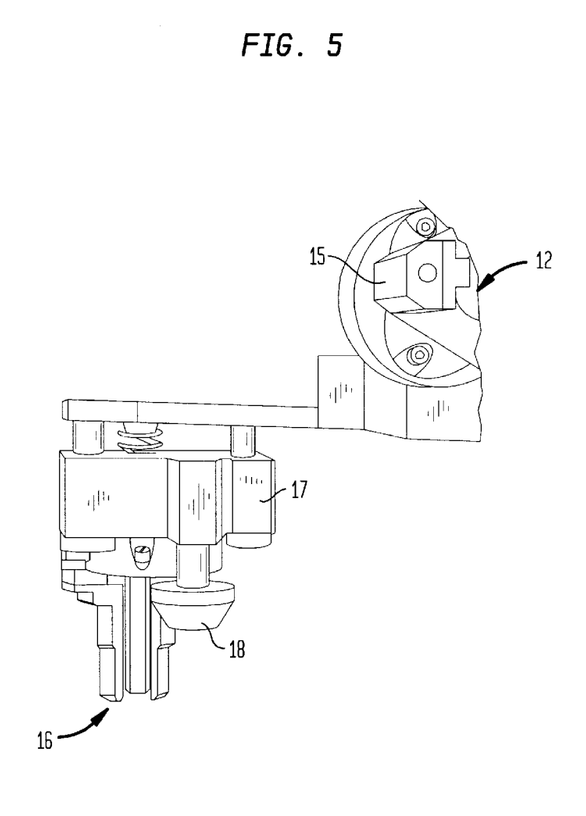

From FIG. 2 we note that trays 11, 111 are oriented towards a robot arm 12 with a compound movement, placed on a platform 13 which is attached to the ground in a stable manner on its' own feet 14, with said arm being controlled by a non-illustrated programmable processor, and that said arm being supplied at its' end with a pair of self centering external pincers 15, 15' as per FIG. 4, and at ninety degrees with respect to these brings a self centering pincer 16 for the inside, as per FIGS. 4 and 5, placed on a spring platform 17, together with and parallel to a conical pad. The arm 12 cyclically orients the pincers 15, 15' vertically towards the bottom and with these is placed above tray 111 to grasp a pair of pipes 6, 6' or pincer 16 and pad 18 are vertically oriented towards the bottom with which are placed on tray 11 to be inserted with pincer 16 in the central seat 2 of a star cross and to engage one of the end seats 5, 5' of the same star cross with pad 18. This engagement stops pad 18 from rotating relative to pincer 16, and pad 18 will remain in this stable position to engage subsequent star cross seat ends 5, 5'.

Figures 6, 7, 8, 12:
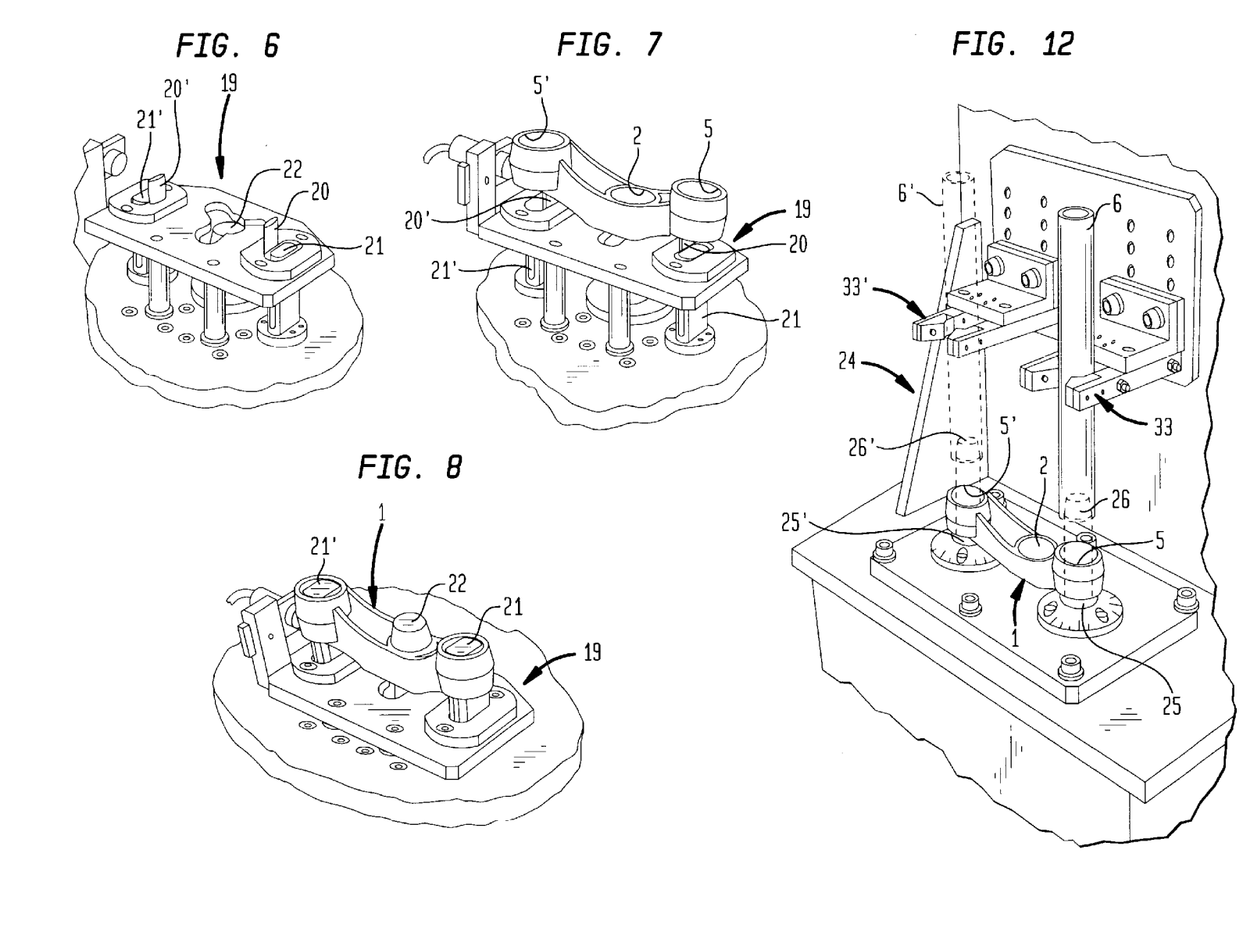
FIGS. 6, 7, and 8 illustrate in perspective and in different stages of assembly, the parts of the station relative to the inspection of the internal diameters of the star cross seats, prior to the introduction of these last into the heating oven.
FIG. 12 illustrates in perspective other details of the station in FIG. 11.

The star cross taken from tray 11, is placed by arm 12 in a control station 19 placed laterally at station 10 and better illustrated in FIG. 6. Station 19 includes a pair of vertical appendices 20, 20' which involve the lower parts of the end seats 5, 5' of the star cross and rest on the internal projections 105 of said seats (FIG. 13), as illustrated in FIG. 7. In phase succession, as illustrated in FIG. 8, in the end seats 5, 5' and in the intermediary seat 2 of the star cross, are lifted and inserted into the feelers of type noted 21, 21' and 22 which register the diameter of said seats of the star cross and if the measurements noted enter within the prescribed tolerances, the cross star itself is taken by the arm 12 of the unit 16, 18 and is transferred to the following work phase, while if the measurements are not correct, the star cross itself is deposited by the arm 12 into the discard tray 211.

Figure 10:
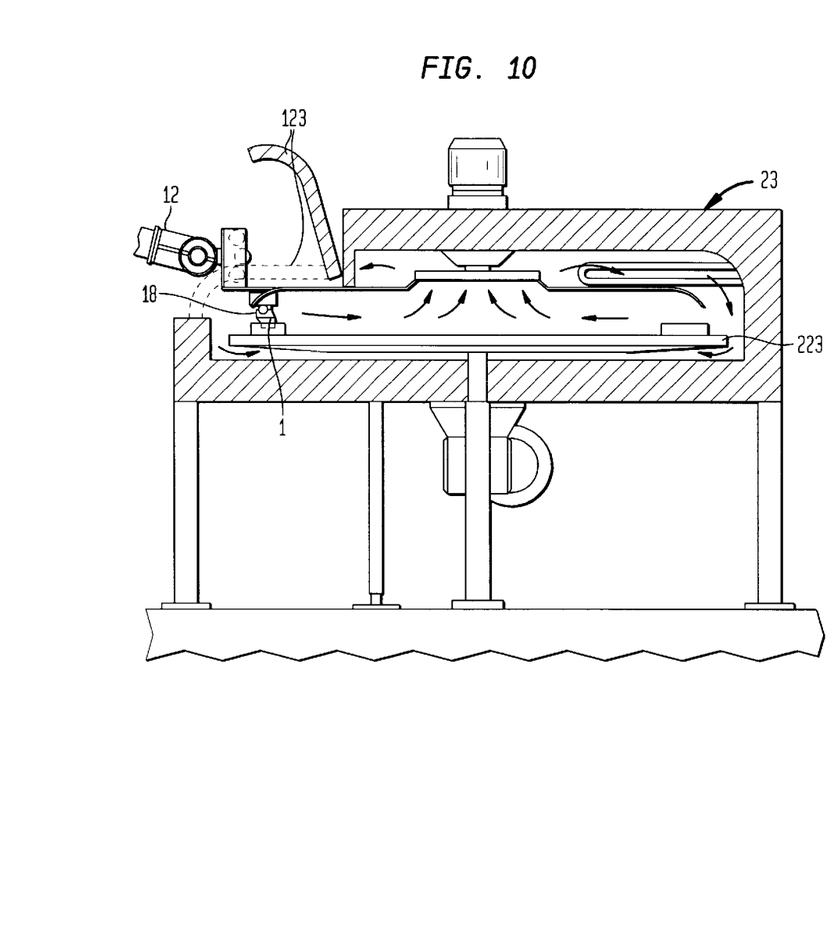
FIG. 10 illustrates laterally and with parts in cross section, the heating oven for the star crosses, during the phase of cooperation with the robot arm.
Figure 11:
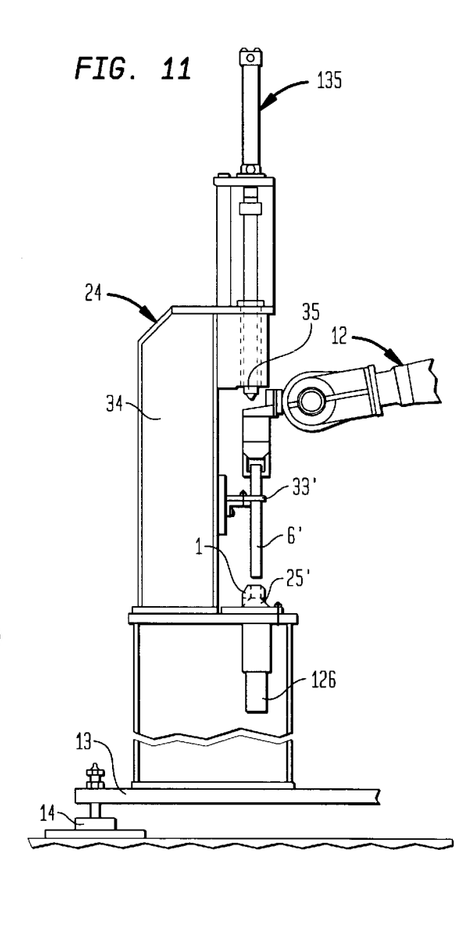
FIG. 11 illustrates in lateral elevation the assembly station of the pipes in the star cross seats, during the phase in which the pipes themselves will be positioned by the robot arm in this station.

The following work station in which the star cross 1 are inserted and placed horizontally, consists in a rotating oven with a vertical axis 23 (FIG. 2 and FIG. 10), equipped with a door 123 which in the proper phase opens and closes and which brings on the turntable 223 a concentric crown of supports equal to those of the trays 11, 11' to support the inverted star crosses in a horizontal position, one following the other and placed tangentially with respect to the orbit of rotation. In the oven, the star crosses are heated, for example, by electricity, at a temperature included between 30 and 40 degrees C, which has the function of enlarging the diameter of the seats of said star crosses, in the preestablished amount. At the beginning of the structure, arm 12 completely fills the oven 23 with star crosses, while in the functional condition of the structure itself, each time the arm 12 inserts a star cross in the oven, then takes one of the ones heated to the aforesaid temperature level and inserts it in an assembly station 24 placed on platform 13 and better shown in FIGS. 11, 12, 13 where it is noted that said overturned star cross 1 is positioned with the end seats 5, 5' on bushings 25, 25' on which the same seats rest on internal projections. From the top of the bushings 25, 25', jut cones 26, 26' normally in a drawn back position illustrated with a continuous mark in FIG. 13, useful as a centering method, not only for the cross stars, but also for the pipes, as stated later, said cones being connected to the appropriate means of axial movement 126.

Figure 9:
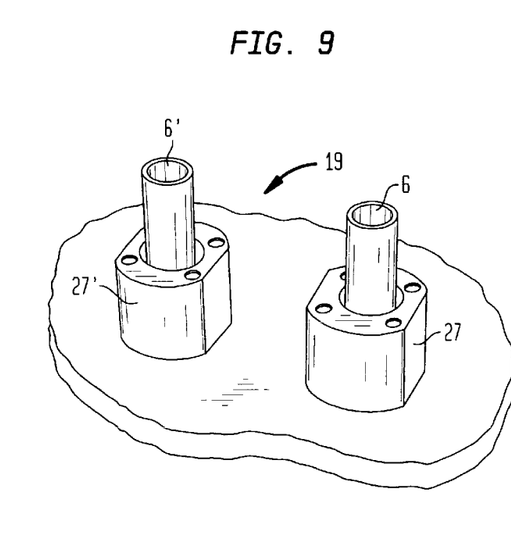
FIG. 9 illustrates in perspective the part of the station relative to the inspection of the external diameter of the lower ends of the pipes.
Figure 14:
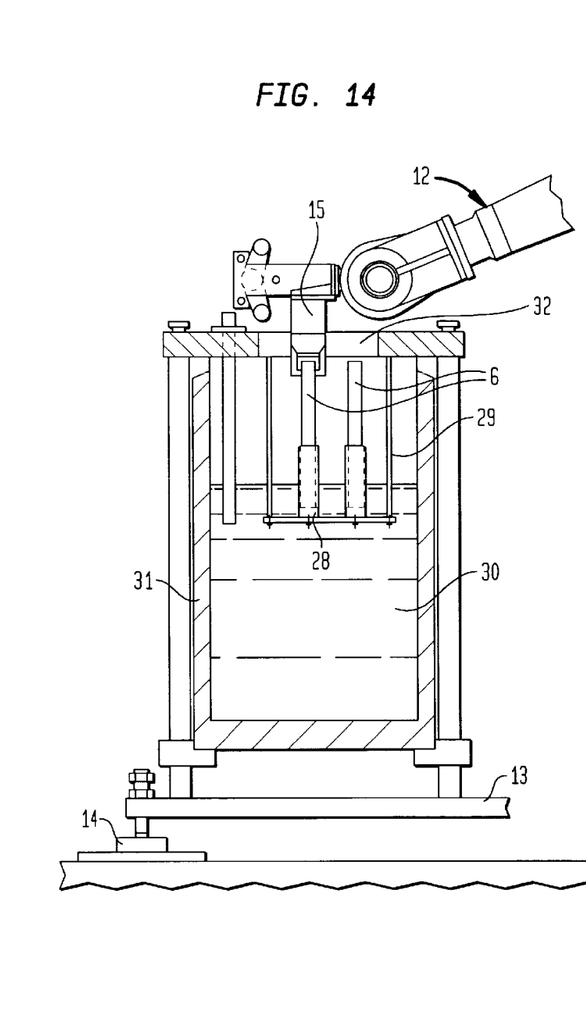
FIG. 14 illustrates laterally and with parts in cross section, the cooling station for the ends of the pipes to be connected in the corresponding end seats of a star cross.

In a work phase successive to the aforesaid ones, the robot arm 12 orients the pincers 15, 15' towards the bottom and with these takes a pair of pipes 6,6' by their upper ends from the tray 111, and inserts them into seats 27, 27' of the control station 19 (see FIGS. 2 and 9) where the methods noted and not illustrated check the external diameter of the lower end of said pipes. If the pipes do not have a diameter suitable to their use, they are placed in the discard tray 311, while if the diameter of said pipes is suitable (FIGS. 2, 14) arm 12 inserts the lower end of the same pair of pipes in the tubular and vertical supports 28 in a basket 29 immersed in a liquid nitrogen bath 30 contained in a storage tank 31 fixed on platform 13 and equipped with an upper opening 32. The tank is subject to all safety and inspection methods that the situation requires. After having deposited a pair of pipes in the basket 29, the robot arm 12 lifts a pair of pipes deposited during a preceding cycle from the same basket and inserts the middle parts of said pipes in between the spring jaws of the corresponding fixed and horizontal pincers 33, 33' (FIGS. 2, 11, 12) brought by a column 34 of the station 24, placed above the bushings 25, 25' in a manner as to line up with these pipes 6, 6'. While the pipes are still held by their upper ends by the pincers 15, 15' the lower cones 26, 26' (FIG. 13) are raised through the seat ends of the star crosses 1 and are inserted into the lower end of said pipes (FIG. 12) with the result that they undergo a first alignment action with said seats of the star cross 1. In rapid succession of phases the pincers 15, 15' of the robot arm abandon the pipes 6, 6' held by the fixed and intermediary pincers 33, 33', and a battery of pushers 35 which by the relative actuators 135 are lowered and their conical heads engage the upper ends of the pipes and brings these last to insert themselves with their lower ends into the end seats 5, 5' of the star cross 1, as illustrated in FIG. 13, while the centering cones 26, 26' lower as a reaction. It is evident how in the connecting phase, the pipes should be maintained in a perfectly vertical condition and aligned with the end seats of the star cross, of the cooperation with the conical heads of the lower centerer 26, 26' and by the upper battery of pushers 35.

Due to the cooling effect determined by the liquid nitrogen, the lower ends of the pipes 6, 6' enter easily and rapidly into the heated ends of the ends of the star cross, avoiding structural deformities and the inconveniences of pressure connection. The manufacturing tolerance of the pieces and the double thermal treatment of cooling and heating of the pieces themselves are such that when the coupled piece return to room temperature, they will turn out to be connected to each other with the predicted tightening. Aside from the advantage deriving from the lack of deformities in the connected parts, it is evident how the connecting procedure is carried out in a shorter time and how it can be automatically carried out, with the highest safety and reliability.

A few seconds immediately after the coupling, the pipes 6, 6' are sufficiently fastened in the star cross seats and the pincers 15, 15' of the robot arm can take up the pipes themselves by their upper end and may transport the complex of assembled pieces on tray 11 of station 10.

The station 10 and assembly station 24, may be arranged to allow the automatic assembly of the pipe 3 of the steering mechanism which may be contained in certain seats of tray 111 and which may be manipulated by one of the pincers 15, 15'. The steering column pipe 3 will be mounted in the appropriate seat 2 of the star cross, simply with pressure, without having a prior cooling in liquid nitrogen. Using the means afforded them, the battery of pushers 35 will provide for the assembly.

Upon completion of the assembly of all of the pieces placed in trays 11 and 111, station 10 rotates 180 degrees to place the robot arm 12 in relation to the trays 11', 111'. With new pieces to assemble, while trays 11, 111 are place on the operators side who will arrange to unload and reload them with new pieces.

It remains understood that the description refers to a preferred form for the creation of the finding, with the omission of the construction details relative to the methods of inspection and safety necessary to the programming and automatic function of the apparatus, inasmuch as they are intuitable and easily created by technicians in the field. It is also understood that numerous variations and modifications can be brought to the above finding especially in the area of building, which can for example refer to the elimination of the inspection station 19 in the case in which the pieces are subject to size check prior to being loaded in the station 10. These and all those modifications and considerations which are in any case intuitable by technicians in the field, do not lie beyond the scope of the finding, as shown above, and as shown and claimed in the following.

What is claimed is:

1. An apparatus for connecting a star cross piece having at least two seat end bores therethrough to at least one tube of each leg of bicycle or motorcycle forks, said apparatus comprising:

a feed station for supplying said legs and said star cross pieces;

at least one robot arm, said robot arm comprising at least one pair of first gripping means to grasp said legs and at least one second gripping means to grasp said star cross pieces;

means for heating seat ends of said star cross piece to increase the internal diameter thereof;

means for cooling upper ends of said legs to reduce the external diameter thereof;

an assembly station comprising means for horizontally supporting said heated star cross such that said openings of said seat ends are facing upward, means for vertically supporting said cooled legs in alignment above said seat ends of said star cross, and means for inserting said upper ends of said legs into said openings of said seat ends.

2. An apparatus according to claim 1, wherein said means for vertically supporting said cooled legs positions said legs such that said upper ends thereof are facing downward.

3. An apparatus according to claim 1, wherein said robot arm cyclically inserts and extracts said legs from said means for cooling.

4. An apparatus according to claim 1, wherein said means for cooling is liquid nitrogen.

5. An apparatus according to claim 1, wherein said heating occurs at a temperature in the range of 30 to 40 degrees Celsius.

6. An apparatus according to claim 1, wherein said means for heating is an oven.

7. An apparatus according to claim 1, wherein said heating occurs at a temperature above 40 degrees Celsius.

8. An apparatus according to claim 1, wherein said means for heating and said means for cooling are within said feeding station.

9. An apparatus according to claim 8, wherein said apparatus further comprises an inspection station.

10. An apparatus according to claim 9, wherein said inspection station comprises means for checking said internal diameter of said seat ends and said external diameters of said upper ends of said legs after said star cross piece and said legs have been retrieved from said feed station.

* * * * *